US010980224B2

(12) United States Patent
Zhang et al.

(10) Patent No.: US 10,980,224 B2
(45) Date of Patent: Apr. 20, 2021

(54) PILLAR DEVICE FOR ADHESIVE INSECT CAPTURE WITH BIRD GUARDS

(71) Applicant: Sterling International Inc., Spokane, WA (US)

(72) Inventors: Qing-He Zhang, Greenacres, WA (US); Marc Chapin, Spokane, WA (US); Rodney G. Schneidmiller, Greenacres, WA (US)

(73) Assignee: Sterling International Inc., Spokane, WA (US)

( * ) Notice: Subject to any disclaimer, the term of this patent is extended or adjusted under 35 U.S.C. 154(b) by 273 days.

(21) Appl. No.: 15/943,649

(22) Filed: Apr. 2, 2018

(65) Prior Publication Data

US 2019/0110460 A1 Apr. 18, 2019

Related U.S. Application Data

(63) Continuation-in-part of application No. 29/621,934, filed on Oct. 12, 2017, now Pat. No. Des. 831,782.

(51) Int. Cl.
*A01M 1/14* (2006.01)
*A01M 1/02* (2006.01)

(52) U.S. Cl.
CPC ............. *A01M 1/14* (2013.01); *A01M 1/02* (2013.01); *A01M 2200/012* (2013.01)

(58) Field of Classification Search
CPC .......... A01M 1/14; A01M 1/145; A01M 1/16; A01M 1/10; A01M 1/106
USPC ........................................... 43/114, 115, 117
See application file for complete search history.

(56) References Cited

U.S. PATENT DOCUMENTS

| | | | | | |
|---|---|---|---|---|---|
| 1,108,870 | A | * | 8/1914 | Arnold | A01M 1/14 43/115 |
| 1,552,649 | A | * | 9/1925 | Smith | A01G 13/10 43/107 |
| 1,561,832 | A | * | 11/1925 | Corsi | A01M 1/14 43/115 |
| 1,743,664 | A | * | 1/1930 | Frost | A01M 1/04 43/112 |
| 1,936,468 | A | * | 11/1933 | Folmer | A01M 1/02 43/112 |

(Continued)

*Primary Examiner* — Darren W Ark
*Assistant Examiner* — Kevin M Dennis
(74) *Attorney, Agent, or Firm* — Christensen O'Connor Johnson Kindness, PLLC

(57) ABSTRACT

An insect trap with bird guards prevents or deters small animals from becoming stuck to the trap, and includes a pillar mounted between a base member and a cap member. The pillar is located radially inwardly from the outer perimeter of the base and cap members, and has an outer surface having a coating of an adhesive selected for ensnaring target insects. A number of bird guards have end portions attachable to the base member and the cap member, and include a plurality of elongate members extending between the end portions, and are spaced away from the pillar. A spacing member, for example, a crossbeam, connects the elongate members for each guard, and is positioned radially inwardly from the elongate members, and at an intermediate longitudinal position, such that the elongate members will not engage the adhesive surface. The base and cap may further include spike members that extend away from the pillar.

16 Claims, 5 Drawing Sheets

(56) References Cited

U.S. PATENT DOCUMENTS

| | | | | |
|---|---|---|---|---|
| 1,952,795 A * | 3/1934 | Frost | A01M 1/04 | 43/112 |
| 1,985,921 A * | 1/1935 | Felmer | A01M 1/04 | 43/112 |
| 2,037,431 A * | 4/1936 | O'Connell | A01M 1/16 | 43/115 |
| 2,061,458 A * | 11/1936 | Folmer | A01M 1/04 | 43/112 |
| 2,951,310 A * | 9/1960 | Anderson | A01M 1/223 | 43/112 |
| 3,473,251 A * | 10/1969 | Kahn | A01M 1/223 | 43/112 |
| 3,758,980 A * | 9/1973 | Bialobrzeski | A01M 1/223 | 43/112 |
| 4,074,457 A * | 2/1978 | Sato | A01M 1/145 | 43/113 |
| 4,182,069 A * | 1/1980 | De Yoreo | A01M 1/04 | 43/112 |
| 4,248,005 A * | 2/1981 | Hedstrom | A01M 1/04 | 43/112 |
| 4,328,636 A * | 5/1982 | Johnson | A01K 39/0106 | 43/107 |
| 4,454,677 A * | 6/1984 | Chuang | A01M 1/04 | 43/112 |
| D283,152 S * | 3/1986 | Cunning | D22/123 | |
| 4,754,570 A * | 7/1988 | Bakke | A01M 1/04 | 43/112 |
| 4,962,611 A * | 10/1990 | Millard | A01M 1/04 | 362/179 |
| 5,020,270 A * | 6/1991 | Lo | A01M 1/08 | 43/112 |
| 5,048,224 A * | 9/1991 | Frisch | A01M 1/02 | 43/107 |
| D326,305 S * | 5/1992 | Wah | D22/123 | |
| 5,274,949 A | 1/1994 | Beaton | | |
| 5,301,458 A * | 4/1994 | Deyoreo | A01M 1/04 | 43/112 |
| 5,363,589 A * | 11/1994 | Flynn | A01M 1/02 | 43/107 |
| D359,790 S | 6/1995 | Blotnick | | |
| 5,557,880 A * | 9/1996 | Schneidmiller | A01M 1/02 | 43/107 |
| 6,050,025 A * | 4/2000 | Wilbanks | A01M 1/023 | 43/112 |
| 6,108,966 A * | 8/2000 | Otomo | A01M 1/145 | 43/113 |
| D467,295 S | 12/2002 | Andrews et al. | | |
| D467,635 S | 12/2002 | Andrews et al. | | |
| D471,950 S * | 3/2003 | Berger | D22/119 | |
| 6,568,124 B1 * | 5/2003 | Wilbanks | A01M 1/023 | 43/112 |
| 6,618,984 B1 * | 9/2003 | Li | A01M 1/04 | 43/107 |
| 6,655,078 B2 * | 12/2003 | Winner | A01M 1/023 | 43/114 |
| 6,860,062 B2 | 3/2005 | Spragins | | |
| 7,310,907 B2 | 12/2007 | Suteerawanit | | |
| 7,832,140 B2 * | 11/2010 | Wilbanks | A01M 1/023 | 43/112 |
| 8,109,036 B1 * | 2/2012 | Wilbanks | A01M 1/023 | 43/112 |
| D675,282 S * | 1/2013 | Frisch | D22/122 | |
| D700,269 S * | 2/2014 | Chapin | D22/122 | |
| 9,015,988 B2 * | 4/2015 | Zhang | A01M 31/008 | 43/107 |
| 9,060,503 B2 * | 6/2015 | Gilbert, II | A01M 1/145 | |
| D761,932 S | 7/2016 | Zhang et al. | | |
| D818,558 S | 5/2018 | Wang et al. | | |
| D831,782 S | 10/2018 | Zhang et al. | | |
| D873,948 S * | 1/2020 | Chapin | D22/122 | |
| D873,949 S * | 1/2020 | Chapin | D22/122 | |
| 2003/0061757 A1 * | 4/2003 | Askin | A01M 1/023 | 43/112 |
| 2003/0070346 A1 * | 4/2003 | Winner | A01M 1/023 | 43/112 |
| 2005/0091911 A1 * | 5/2005 | Matts | A01M 1/026 | 43/131 |
| 2011/0302821 A1 * | 12/2011 | Casagrande | A01M 1/103 | 43/58 |
| 2013/0318854 A1 * | 12/2013 | Zhang | A01M 31/008 | 43/2 |
| 2014/0165452 A1 * | 6/2014 | Rocha | A01M 1/08 | 43/113 |
| 2016/0309694 A1 * | 10/2016 | Azuela | A01M 23/005 | |
| 2017/0354135 A1 * | 12/2017 | Ching | A01M 1/106 | |
| 2019/0090470 A1 * | 3/2019 | Lee | A01M 1/08 | |

* cited by examiner

PILLAR DEVICE FOR ADHESIVE INSECT CAPTURE WITH BIRD GUARDS

CROSS-REFERENCE TO RELATED APPLICATION

This application is a continuation-in-part of application Ser. No. 29/621,934, filed Oct. 12, 2017; the entire disclosure of said application is hereby incorporated by reference herein.

BACKGROUND

Traps for flying insects are known in the art and often have been quite successful at trapping target insects. For example, one of the inventors of the insect trap disclosed herein pioneered conical element hanging traps, such as the wasp traps described and claimed in U.S. Pat. No. 4,551,941, which issued on Nov. 12, 1985, to Schneidmiller, and which is hereby incorporated by reference in its entirety. Schneidmiller discloses a transparent cylindrical insect trap that is selective to entrapping wasps.

Flying insects, for example, various social wasps, including paper wasps, hornets, and yellow jackets, can be a significant nuisance and a potential hazard to people and animals engaged in outdoor activities. Such flying insects can be prevalent in rural settings and in very well-developed residential areas. Various species of insects, flying and otherwise, are also common in agricultural settings and in other commercial processing venues, including, for example, meat packing factories, food processing facilities, and livestock ranches.

Insect traps that use an adhesive to capture flying insects, for example fly paper, are known in the art. Insect traps that use an adhesive to entrap insects have safety and environmental advantages. In particular, they do not require the use of toxic insecticides, which can present risks to persons during production of traps and to users and pets during use of the trap. Ultimately such toxic insecticides end up in the waste stream.

Fly paper strips are typically formed as long, narrow, flexible, substrates covered with a nonpoisonous sticky coating, and are usually brown in color. A fly landing on the sticky substance becomes entrapped, unable to detach from the fly paper. However, hanging strips from a ceiling can be inconvenient for a number of reasons. Conventional fly paper strips have a length of approximately one meter. Therefore, ceilings must be relatively high in order to accommodate the fly paper strips without interfering with normal occupancy of the room. Also, it can be difficult to install fly paper strips on a ceiling, requiring the use of a ladder or other elevating device. It will also be appreciated that flies may not spend much time flying near the ceiling because food sources are typically closer to the ground. Therefore, a large portion of the fly paper may be disposed in a region that is sparsely populated with flies.

Adhesive insect trapping systems used in agricultural Integrated Pest Management (IPM) programs are sometimes referred to as "sticky cards" in an in particular "yellow sticky cards." Sticky cards have been widely used for monitoring and/or mass-trapping of target pest (flying) insects in both greenhouses and in field crops.

A pillar-type device which may include an adhesive outer surface and suitable visual attractants is disclosed in U.S. Pat. No. 9,015,988, to Zhang et al., which is hereby incorporated by reference in its entirety. The pillar may additionally be decorated on its outer surface with a visual attractant to lure target insects to the trap 100. Examples of suitable semiochemical attractants which may also be incorporated into traps are disclosed in U.S. Pat. Appl. Publ. No. 2011/0165115, to Zhang et al.

Although adhesive strips, sticky cards or pillar/stick traps have found success, a risk associated with traps that rely on an adhesive to entrap flying insects is that non target species, for example, birds or other small animals, may inadvertently become ensnared by the adhesive, particularly when the adhesive strips are used outdoors. It would be advantageous to provide an adhesive insect trap that includes means to prevent or deter the entrapment of non-target species.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An insect trap with bird guards includes a base member, a cap member, and an adhesive pillar mounted to the base and cap members. A number of elongate bird guards are attachable to the base member and to the cap member. The bird guards define a plurality of elongate members joining first and second end portions. The elongate members are spaced away from the adhesive pillar. Spacing members are associated with the plurality of elongate bird guards and are fixed to at least one of the plurality of elongate members at a location between the first end portion and the second end portion and extending inwardly from the elongate member towards the pillar outer surface.

In an embodiment the base member has a plurality of protruding barrier walls. The barrier walls extend upwardly around a portion of the pillar first end. The base member also has a plurality of upwardly extending spike members having a spacing portion disposed between an associated one of the barrier walls and the pillar outer surface and a projecting portion extending upwardly from the spacing portion and away from the pillar outer surface.

In an embodiment the cap member also includes a plurality of protruding barrier walls, wherein the barrier walls extend downwardly around a portion of the pillar second end, and a plurality of downwardly extending spike members having a second spacing portion disposed between the barrier wall and the pillar outer surface and a projecting portion extending downwardly from the second spacing portion and away from the pillar outer surface.

In an embodiment the plurality of spacing member are configured to abut the pillar outer surface.

In an embodiment the plurality of spacing members each comprise a crossbeam associated with one of the bird guards that connects with all of the plurality of elongate members of the associated bird guard.

In an embodiment the bird guards have at least three elongate members, and the crossbeam is connected to the plurality of elongate members with spacing posts.

In an embodiment the elongate pillar is a tube having a plurality of planar faces.

In an embodiment the elongate pillar is a tube having at least six planar faces.

In an embodiment the barrier walls of the base member and the barrier walls of the cap member each define a channel configured to receive and retain a corresponding one of the plurality of elongate bird guards.

In an embodiment the cap member defines a hanger portion that is configured to extend from the cap member.

In an embodiment the pillar includes a plurality of connected panels that define a polygonal tube.

In an embodiment the base member and the cap member each define a plurality of interior supports, each interior support positioned opposite to a corresponding one of the plurality of barrier walls, wherein the interior supports are configured to abut an interior surface of one of the plurality of panels.

An insect trap includes a base member, a cap member, and a tubular pillar attached to the base member and to the cap member, wherein the tubular pillar has an outer surface comprising an adhesive coating. The base member and the cap member each comprise a wall portion disposed radially outward from the pillar, the wall portions each defining a plurality of protruding barriers. A plurality of elongate bird guards include i) a first end attached to one of the base member protruding barriers, ii) a second end attached to a corresponding one of the cap member protruding barriers, iii) three elongate members joining the first end to the second end, and (iv) a crossbeam connecting the three elongate members. The crossbeams are configured to maintain the elongate members spaced away from the pillar outer surface. The base member further comprise a plurality of upwardly extending spike members disposed between the wall portion and the pillar outer surface and extending upwardly and away from the pillar outer surface.

In an embodiment the crossbeams are configured to abut the pillar outer surface.

In an embodiment for each bird guard the crossbeam is connected to the three elongate members with spacing posts.

In an embodiment the tubular pillar defines a plurality of planar faces.

In an embodiment the tubular pillar comprises at least six planar faces.

In an embodiment the barriers of the base member and the cap member each define a channel configured to receive and retain a first or second end of a corresponding one of the plurality of elongate bird guards.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
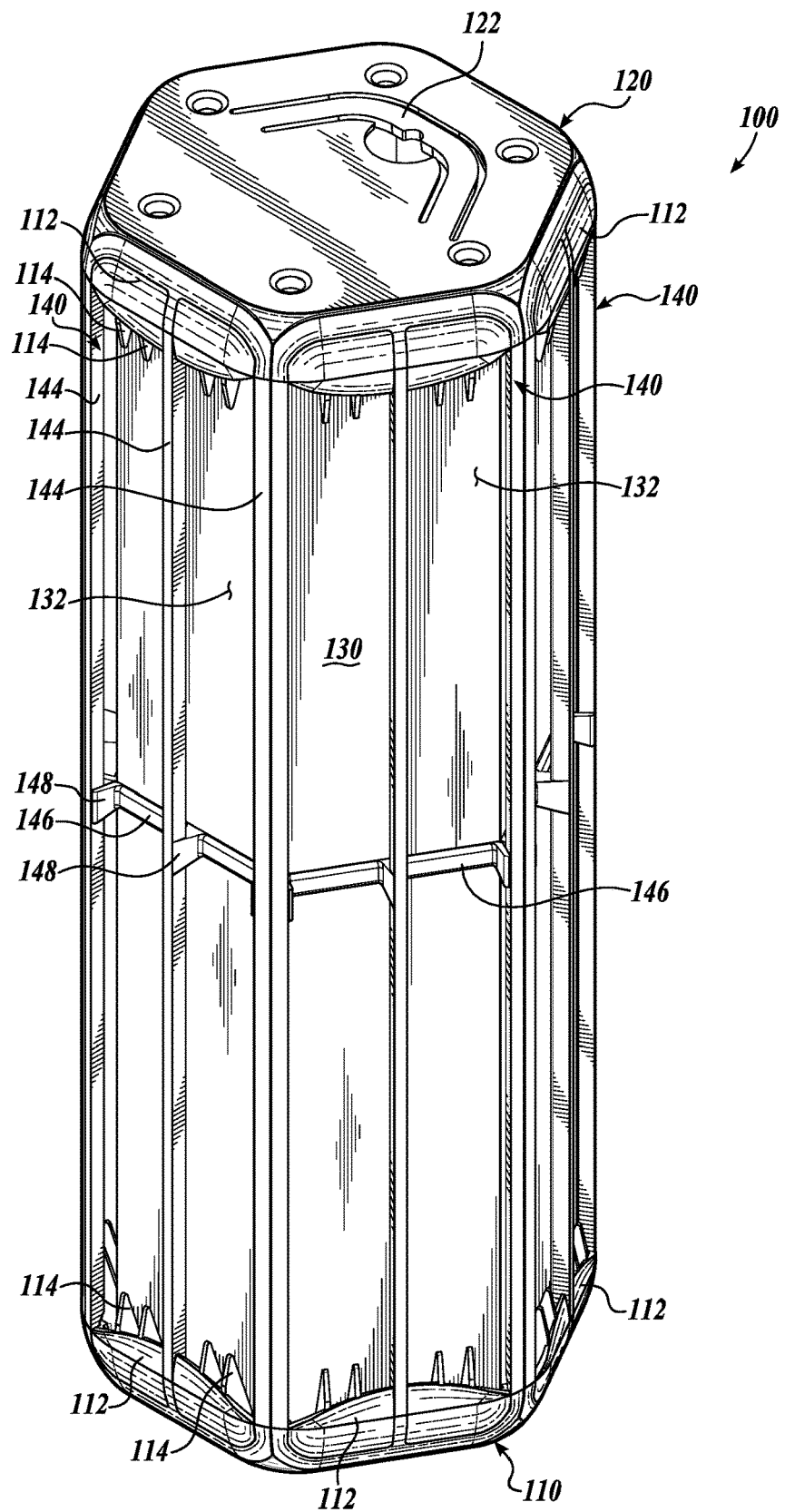
FIG. 1 is a perspective view of an insect trap with bird guards in accordance with the present invention.
Figure 2:
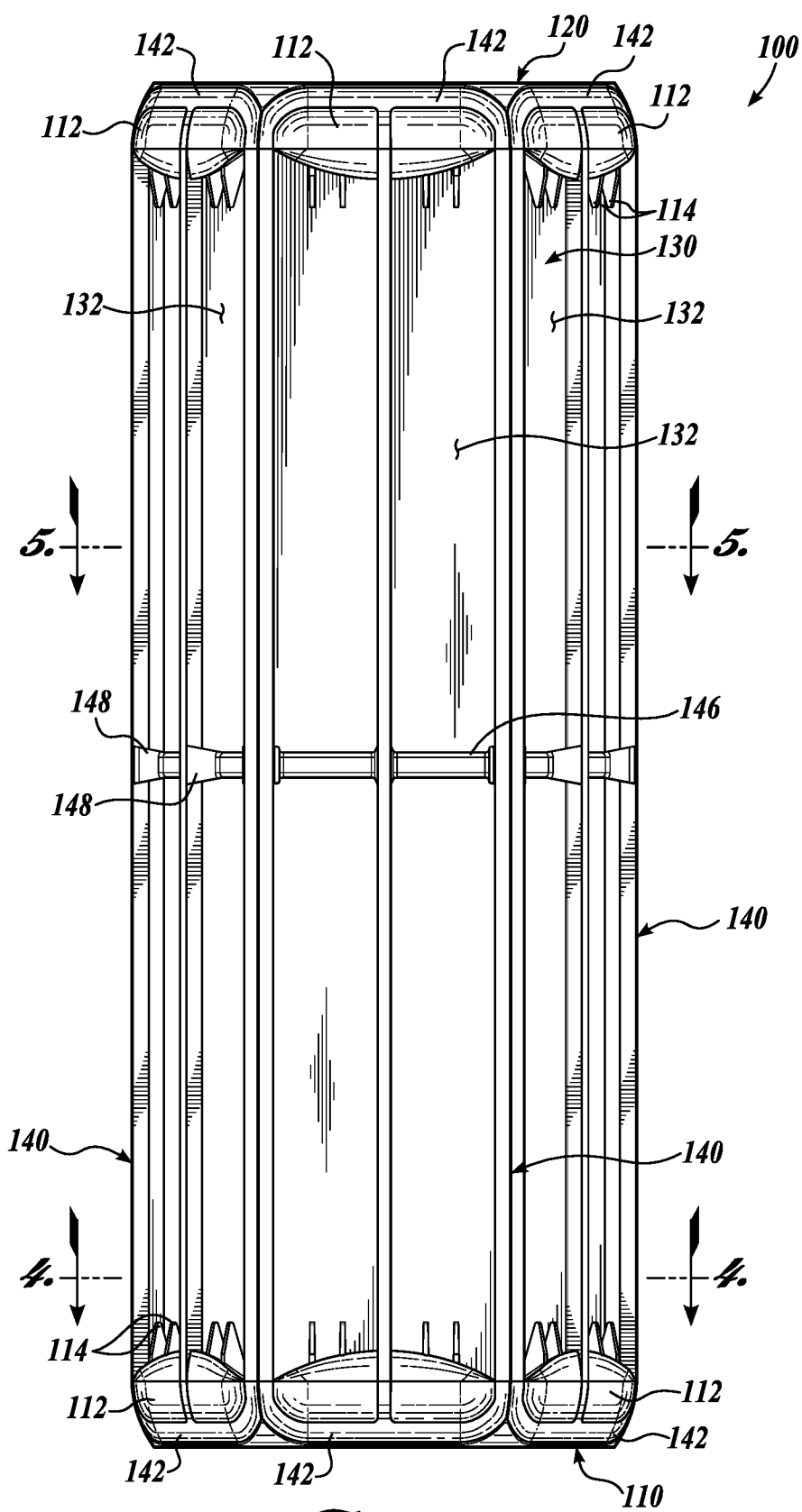
FIG. 2 is a front view of the insect trap with bird guards shown in FIG. 1.
Figure 3:
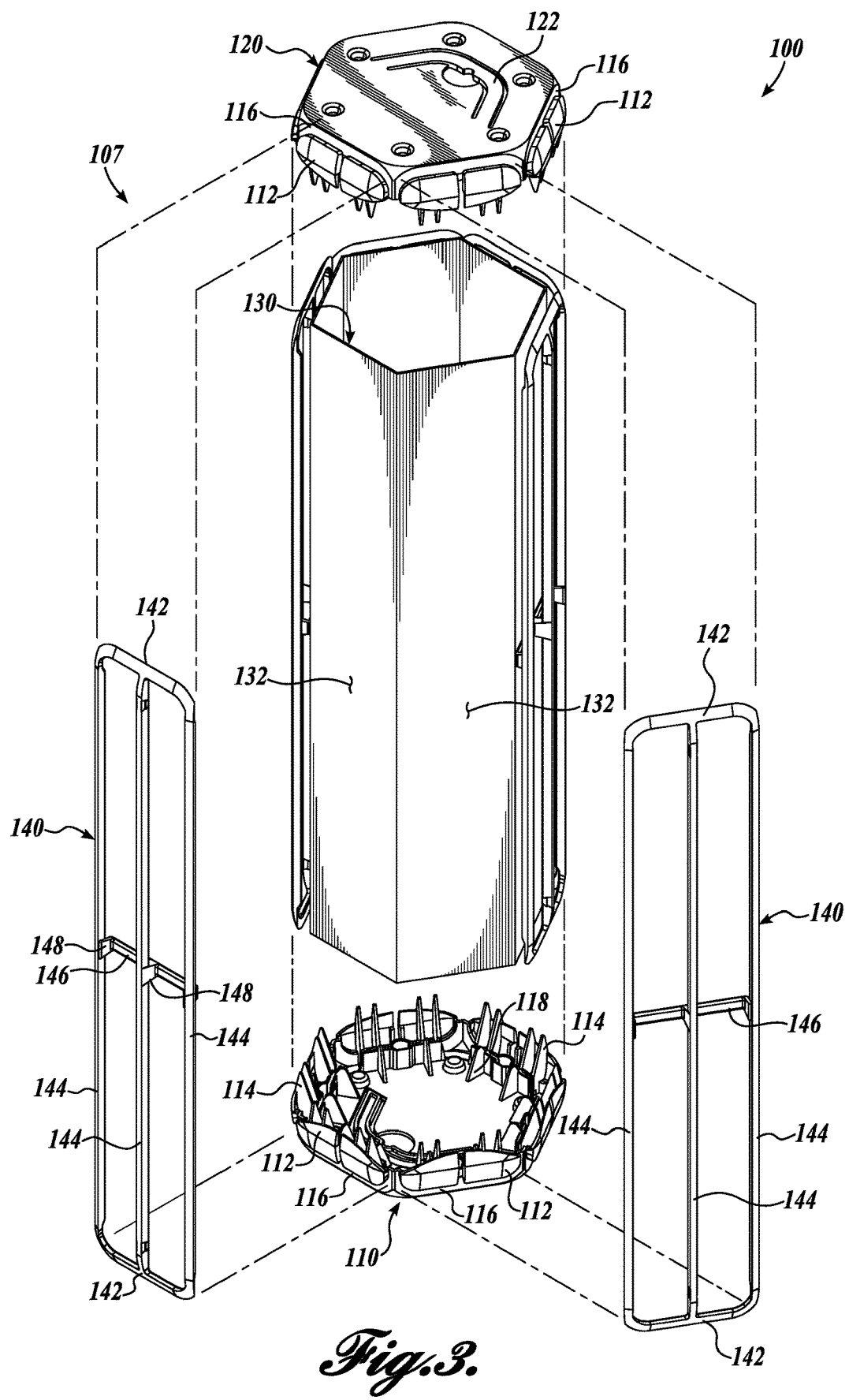
FIG. 3 is a partially exploded view of the insect trap with bird guards shown in FIG. 1.

An insect trap with bird guards 100 in accordance with the present invention is shown in FIG. 1. A front view of the insect trap 100 is shown in FIG. 2, and a partially exploded view of the insect trap 100 is shown in FIG. 3. The insect trap 100 includes a base member 110, a cap member 120, and a pillar 130. The base member 110 is attached to a bottom end of the pillar 130 and the cap member 120 is attached to a top end of the pillar 130. A plurality of elongate bird guards 140 extends between the base member 110 and the cap member 120.

The pillar 130 is an upright polygonal tube having a plurality of planar panels 132 that are connected along adjacent edges to form the tubular structure. In the current embodiment the pillar 130 comprises six similar planar panels 132 that define a right hexagonal tubular pillar 130. Other embodiments of the insect trap are contemplated, including for example, embodiments with a pillar formed with non-planar panels, a polygonal tube formed from any number of panels, or a non-regular tube. For example, the panels may not be of uniform dimension. In another embodiment the pillar may be circular or oval in cross-section. In a current embodiment the pillar 130 is formed from a single planar panel that is die cut to shape, scored or creased, and folded into the tubular shape of the pillar 130 with corresponding long end edges of the panel joined by conventional means, as are known in the art.

The outer faces of the panels 132 are partially or completely coated with an adhesive coating that is selected to entrap target insects that land on or otherwise engage the outer face of the panel 132. Suitable adhesive coatings are well-known in the art, and include, for example, adhesives (for example, traditional rubber or polybutene-based sticky gel and hot melt pressure sensitive adhesives) used in fly paper, yellow sticky card traps, and the like. In some embodiments the adhesive includes a pheromone or other semiochemical compound or blend, selected to attract one or more target insects to the insect trap 100. Examples of suitable semiochemical attractants are disclosed in U.S. Pat. Appl. Publ. No. 2011/0165115, to Zhang et al. The pillar 130 may additionally be decorated on its outer surface with a visual attractant to lure target insects to the trap 100. Suitable visual attractants are disclosed in U.S. Pat. No. 9,015,988, to Zhang et al.

The base member 110 and the cap member 120 are configured to receive and engage opposite ends of the pillar 130. In the current embodiment the base member 110 and the cap member 120 are substantially identical. In other embodiments, the base and cap members may differ in ways not relevant to the present invention. An advantage to having interchangeable base and cap members 110, 120 is decreased manufacturing and inventorying costs, and simplified assembly. The base member 110 and the cap member 120 are larger in the transverse direction than the pillar 130, such that the pillar 130 is disposed radially inwardly from the perimeter of the base member 110 and the cap members 120. In this embodiment the base member 110 and cap member 120 are generally hexagonal similar to the pillar 130, and they each define six outwardly protruding barriers 112. As seen most clearly in the sectional view shown in FIG. 4 (through section 4-4 indicated in FIG. 2) the barriers 112 are spaced radially away from the pillar 130.

A plurality of spike members 114 are located between the barriers 112 and the corresponding panel 132. In this embodiment, four spike members 114 abut each panel 132. The spike members 114 include a base portion 113 extending inwardly from the barrier 112 and having an inner edge that abuts the associated panel 132. A spike portion 115 extends upwardly from the base portion 113. The spike portions 115 angle away from the panel 132. The barriers 112 and spike members 114 cooperatively aid in deterring birds and other small animals from engaging the adhesive face of the panel 132, e.g., via perching or landing. The barriers 112 of the base member 110 and the barriers 112 of the cap member 120 further define a recess or channel 116 that is sized and shaped to receive and retain a corresponding end portion 142 of one of the bird guards 140, as discussed in more detail below.

Figure 4:
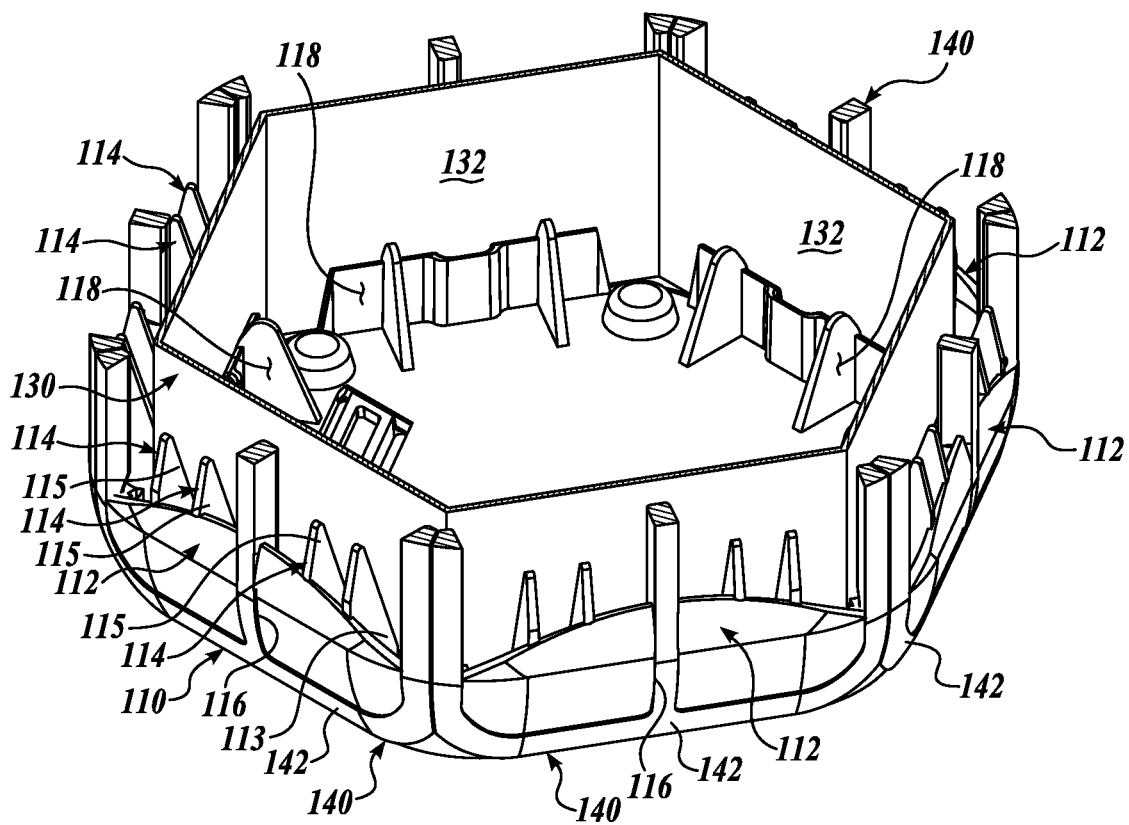
FIG. 4 is a perspective sectional view of the insect trap with bird guards through section 4-4 indicated in FIG. 2.

As indicated in the sectional view of FIG. 4, the base member 110 (and similarly, the cap member 120) further includes six interior supports 118 (three visible in whole or in part), each interior support 118 associated with a corresponding one of the panels 132. The interior supports 118 define a gap between the support 118 and the base portion 113 of corresponding spike members 114, wherein the gap is sized to receive and engage the panel 132. As seen most clearly in FIG. 1, the cap member 120 and/or the base member 110 may further include an integral hanger portion 122 that is configured to be elastically or plastically pulled to an upright position.

The elongate bird guards 140 (six in this embodiment) extend from the base member 110 to the cap member 120. Referring again to FIGS. 3 and 4, each bird guard 140 includes oppositely disposed end portions 142 that are connected by a plurality of elongate bars 144. The end portions 142 are configured to engage the corresponding channels 116 on the base member 110 and on the cap member 120, such that the bird guards 140 are securely retained by the base and cap members 120. For example, the bird guards 140 may be configured to snap-fit into the corresponding channels 116. In this embodiment the channels 116 include a generally horizontal portion that is configured to engage the horizontal portion of the end portions 142 of the bird guards 140 and three leg portions that are configured to engage the ends of the corresponding elongate bars 144. Each bird guard 140 further includes a crossbeam 146 that connects with the elongate bars 144 at an intermediate location along the length of the bird guard 140. In this embodiment the crossbeams 146 are located approximately midway between the corresponding end portions 142. Although in the present embodiment each bird guard 140 includes a single crossbeam 146, other embodiments are contemplated that include more than one crossbeam 146. For example, each of the bird guards 140 may include two or three uniformly spaced crossbeams 146.

Figure 5:
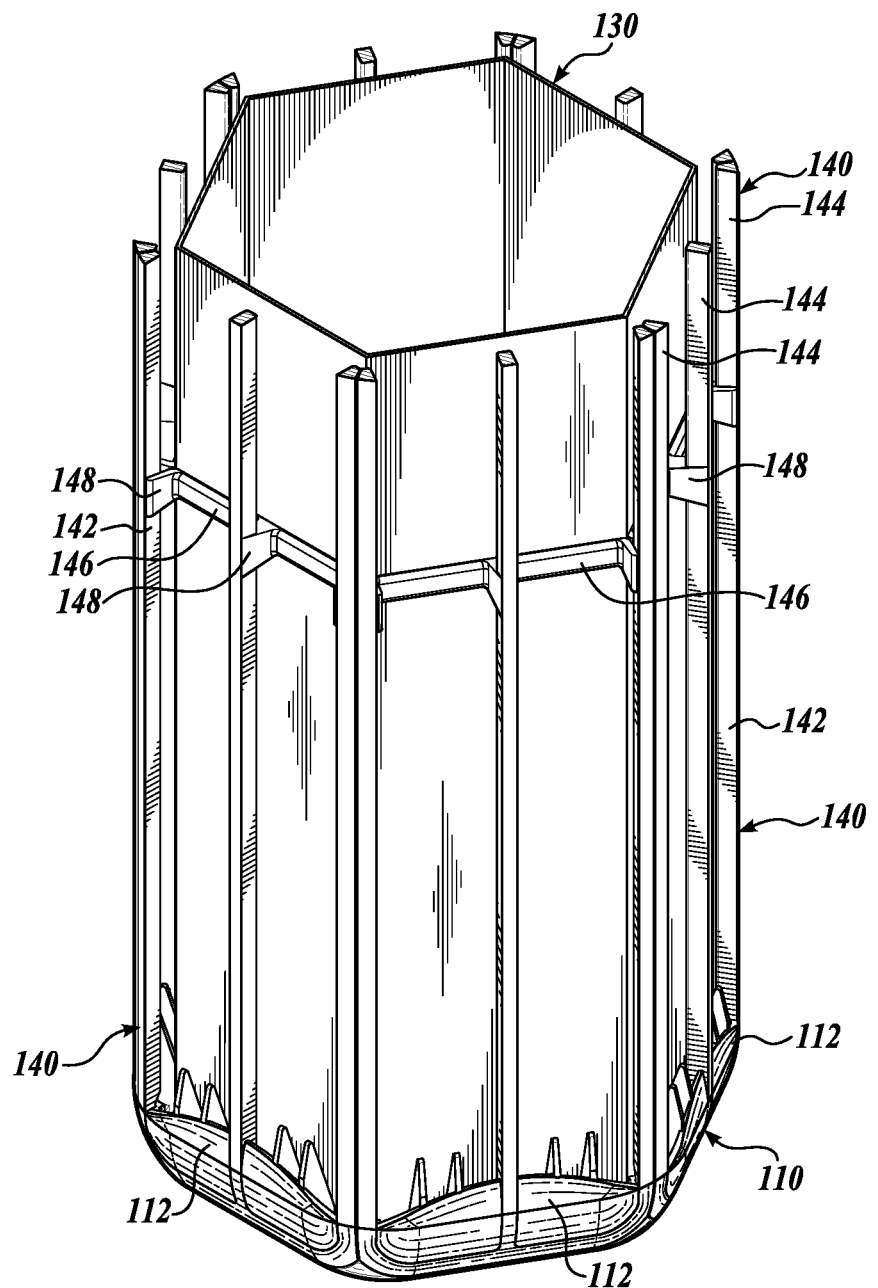
FIG. 5 is a perspective sectional view of the insect trap with bird guards through section 5-5 indicated in FIG. 2.

As seen most clearly in the sectional view of FIG. 5, the crossbeams 146 are connected to the elongate bars 144 with spacing posts 148 that maintain a spacing between the elongate bars 144 and the corresponding pillar panel 132. The crossbeam 146 extends inwardly from the elongate bars 144, and preferably engages the corresponding pillar panel 132. The crossbeams 146, therefore, maintain a desired spacing between the elongate bars 144 and the corresponding panels 132. In particular, the inwardly disposed crossbeams 146 prevent the elongate bars 144 from flexing inwardly (for example, during handling, or from other user or animal activities) and becoming stuck to the adhesive coating on the panels 132. The plurality of bird guards 140 are disposed adjacent to each other, and are configured to collectively encircle the pillar 130.

To use the insect trap 100 a user may press the base member 110 and the cap member 120 onto opposite ends of the pillar, snap the bird guards 140 onto the base member 110 and cap member 120, and stand the insect trap 100 on a convenient flat surface or hang the insect trap 100 in a convenient location using the hanger portion 122 of the cap member 120. It will be appreciated that if birds or other small animals are attracted by captured insects to the insect trap 100, the bird guards 140 mitigate the risk that the bird or other small animal will themselves become ensnared by the adhesive coating on the insect trap 100. Moreover, the protruding barriers 112 and spike members 114 on the base member 100 will deter small birds from attempting to alight on the base member 110, and the protruding barriers 112 and spike members 114 on the cap members will deter small birds from attempting to perch or land on the top of the trap 100 and reaching down to access entrapped insects.

In a current embodiment the bird guards 140, including the end portions 142, elongate bars 144, and the spacing posts 148 are each formed as a single unitary structure, for example, by injection molding. The base member 110 and the cap member 120 are each formed as single unitary structures, for example, by injection molding.

While illustrative embodiments have been illustrated and described, it will be appreciated that various changes can be made therein without departing from the spirit and scope of the invention.

The embodiments of the invention in which an exclusive property or privilege is claimed are defined as follows:

1. An insect trap with bird guards, comprising:
   a base member;
   a cap member;
   a pillar having a first end mounted to the base member and a second end mounted to the cap member, wherein the pillar has an outer surface comprising an adhesive coating;
   a plurality of elongate bird guards, each bird guard having a first end portion attachable to the base member, a second end portion attachable to the cap member, and at least three elongate members joining the first end portion to the second end portion, wherein the at least three elongate members are spaced away from the pillar outer surface; and
   a plurality of spacing members, each spacing member associated with one of the plurality of elongate bird guards and fixed to at least one of the at lest three elongate members at a location between the first end portion and the second end portion and extending inwardly from the at least one elongate member towards the pillar outer surface, wherein each of the plurality of elongate bird guards are independently attachable to the base member and to the cap member with respect to the other of the plurality of elongate bird guards; and
   wherein the plurality of spacing members are configured to abut the pillar outer surface.

2. The insect trap of claim 1, wherein the base member comprises a plurality of protruding base barrier walls, wherein the plurality of protruding base barrier walls extend upwardly around the pillar first end, and a plurality of upwardly extending spike members having a spacing portion disposed between an associated one of the base barrier walls and the pillar outer surface and a projecting spike portion extending upwardly from the spacing portion and away from the pillar outer surface.

3. The insect trap of claim 2, wherein the cap member includes a plurality of protruding cap barrier walls, wherein the plurality of cap barrier walls extend downwardly around the pillar second end, and a plurality of downwardly extending spike members having a second spacing portion disposed between the cap barrier wall and the pillar outer surface and a second projecting spike portion extending downwardly from the second spacing portion and away from the pillar outer surface.

4. The insect trap of claim 2, wherein the plurality of spacing members each comprise a crossbeam associated with one of the bird guards that connects with all of the at least three elongate members of the associated bird guard.

5. The insect trap of claim 4, wherein the associated crossbeam is connected to the at least three elongate members with spacing posts.

6. The insect trap of claim 1, wherein the pillar comprises a tube having a plurality of planar faces.

7. The insect trap of claim 1, wherein the pillar comprises a tube having at least six planar faces.

8. The insect trap of claim 3, wherein the barrier walls of the base member and the barrier walls of the cap member each define a channel configured to receive and retain one of the plurality of elongate bird guards.

9. The insect trap of claim 1, wherein the cap member defines a hanger portion that is configured to extend from the cap member.

10. The insect trap of claim 1, wherein the pillar comprises a plurality of connected panels that define a polygonal tube.

11. The insect trap of claim 3, wherein the base member and the cap member each define a plurality of interior supports, each interior support positioned opposite to a corresponding one of the plurality of base and cap barrier walls, wherein the interior supports are configured to abut an interior surface of the pillar.

12. An insect trap comprising:
   a base member, a cap member, and a tubular pillar attached to the base member and to the cap member, wherein the tubular pillar has an outer surface comprising an adhesive coating, and further wherein the base member and the cap member each comprise a wall portion disposed radially outward from the pillar, the wall portions each defining a plurality of protruding barriers; and
   a plurality of elongate bird guards, wherein the bird guards are connected to the base member and the cap member, each bird guard comprising (i) a first end attached to one of the base member protruding barriers, (ii) a second end attached to a corresponding one of the cap member protruding barriers, (iii) three elongate members joining the first end to the second end, and (iv) a crossbeam connecting the three elongate members and configured to maintain the elongate members spaced away from the pillar outer surface, wherein each of the plurality of elongate bird guards are independently attachable to the base member and to the cap member with respect to the other of the plurality of elongate bird guards; and
   wherein the base member further comprises a plurality of upwardly extending spike members disposed between the wall portion and the pillar outer surface and extending upwardly and away from the pillar outer surface; and
   wherein the crossbeams are configured to abut the pillar outer surface.

13. The insect trap of claim 12, wherein for each bird guard the crossbeam is connected to the three elongate members with spacing posts.

14. The insect trap of claim 12, wherein the tubular pillar defines a plurality of planar faces.

15. The insect trap of claim 12, wherein the tubular pillar comprises at least six planar faces.

16. The insect trap of claim 12, wherein the barriers of the base member and the cap member each define a channel configured to receive and retain the first end or the second end of one of the plurality of elongate bird guards.

* * * * *

UNITED STATES PATENT AND TRADEMARK OFFICE
CERTIFICATE OF CORRECTION

PATENT NO. : 10,980,224 B2  
APPLICATION NO. : 15/943649  
DATED : April 20, 2021  
INVENTOR(S) : Q. Zhang et al.

Page 1 of 1

It is certified that error appears in the above-identified patent and that said Letters Patent is hereby corrected as shown below:

In the Claims

| Column | Line | |
|---|---|---|
| 6 | 35 | Please change "lest" to -- least --. |

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*